US008107559B2

(12) United States Patent
Nakata

(10) Patent No.: US 8,107,559 B2
(45) Date of Patent: Jan. 31, 2012

(54) RECEIVING APPARATUS

(75) Inventor: Kazuhiro Nakata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/988,615

(22) PCT Filed: May 11, 2009

(86) PCT No.: PCT/JP2009/002038

§ 371 (c)(1), (2), (4) Date: Oct. 19, 2010

(87) PCT Pub. No.: WO2010/004676

PCT Pub. Date: Jan. 14, 2010

(65) Prior Publication Data

US 2011/0122934 A1 May 26, 2011

(30) Foreign Application Priority Data

Jul. 7, 2008 (JP) ................................ 2008-176841

(51) Int. Cl.
*H04L 27/00* (2006.01)

(52) U.S. Cl. ....................................................... 375/316

(58) Field of Classification Search .................. 375/224, 375/316, 340; 370/913; 455/3.06, 184.1, 455/186.1, 426.1, 458

See application file for complete search history.

(56) References Cited

U.S. PATENT DOCUMENTS

| | | | | |
|---|---|---|---|---|
| 5,065,452 | A * | 11/1991 | Duckeck et al. | 455/226.1 |
| 5,903,617 | A | 5/1999 | Kamalski | |
| 7,107,029 | B2 * | 9/2006 | Mason | 455/184.1 |
| 7,254,378 | B2 | 8/2007 | Benz et al. | |
| 7,356,319 | B2 * | 4/2008 | Mason | 455/184.1 |
| 2008/0090515 | A1 * | 4/2008 | Wu | 455/3.06 |
| 2009/0131003 | A1 * | 5/2009 | Masamoto et al. | 455/186.1 |
| 2010/0150275 | A1 * | 6/2010 | Dubash et al. | 375/340 |

FOREIGN PATENT DOCUMENTS

| | | | |
|---|---|---|---|
| EP | 1 536 580 | A2 | 10/2004 |
| JP | 10-209988 | A | 8/1998 |
| JP | 11-511936 | A | 10/1999 |
| JP | 2004-343745 | A | 12/2004 |
| JP | 2005-159868 | A | 6/2005 |

* cited by examiner

*Primary Examiner* — Sam K Ahn

(74) *Attorney, Agent, or Firm* — Birch, Stewart, Kolasch & Birch, LLP

(57) ABSTRACT

A receiving apparatus has counters 15 for counting intervals between group types 8A containing TMC data in RDS data in synchronization with an RDS clock signal, and causes a radio control unit 17 to control a sub tuner front end 7 so as to receive the group type 8A and to execute radio processing other than receiving the TMC data during counting of the counters.

4 Claims, 7 Drawing Sheets

FIG.3

| | Purpose | Detailed Contents | Number of Group Types to be Counted | Grounds for Settings |
|---|---|---|---|---|
| Counter A | Counter for Counting Number of RDS Group Types between Group Types Containing TMC Data | Counter for Defining Time Period for Skipping across Next TMC Data Reception When Next TMC Data is Expected to be The Same as Previous Data | 2 × Gap + 1 | Because The Same TMC Data is Transmitted at least Twice Consecutively |
| Counter B | | Counter for Defining Minimum Gap When Previously Received Data is Unknown or is The Same as Current Data (Because of High Possibility That Different Data Will Come Next) | Gap | |
| Counter C | Timeout Counter | Counter for Defining, after Reception of TMC Data Becomes Impossible, Time up to Giving up TMC Reception (Timeout) | Gap + 2 + 1 | Gap + TMC Group Types on Both Sides + One Group Type (Margin) |
| Counter D | Counter for Restarting to Receive TMC | Counter for Defining Time up to Restarting TMC Reception after Timeout of TMC Reception by Counter C | Gap − 1 | Subtract +1 That Counter C Added Extra |

RECEIVING APPARATUS

TECHNICAL FIELD

The present invention relates to an onboard receiving apparatus, and particularly to a receiving apparatus for receiving traffic information (TMC: Traffic Message Channel) broadcast from an RDS (Radio Data System) station.

BACKGROUND ART

For example, a conventional receiving apparatus disclosed in Patent Document 1 receives a broadcast from a broadcasting station selected by a listener with a main tuner, and RDS data blocks (referred to as "group type" from now on) broadcast from an RDS broadcasting station with a background tuner (sub tuner).

In this case, it estimates transmission time between a specific group type containing TMC data and a different group type, performs radio processing (tasks) such as searching for an alternative station during the transmission time, and restarts receiving the TMC data when the transmission time elapses. In this way, it can receive the TMC data stably with the background tuner without losing the function of diversity (searching for an alternative station).

PRIOR ART DOCUMENT

Patent Document

Patent Document 1: Japanese Patent Laid-Open No. 2004-343745.

However, since it estimates the transmission time between the TMC data, it is likely that the conventional receiving apparatus cannot receive the TMC data stably when the estimation accuracy of the transmission time is not enough. In addition, if it falls into a state in which reception itself of the RDS data is impossible, even if the reception is interrupted temporarily, it is necessary to estimate the transmission time again, which presents a problem of delaying restoration.

The present invention is implemented to solve the foregoing problems. Therefore it is an object of the present invention to provide a receiving apparatus capable of receiving the TMC data stably and immediately after restoration even if the reception of the RDS data becomes impossible for a time.

DISCLOSURE OF THE INVENTION

A receiving apparatus in accordance with the present invention has a first receiving system for receiving a broadcast signal from a broadcasting station to reproduce radio sound and a second receiving system for receiving RDS (Radio Data System) data in the broadcast signal, the second receiving system including: an RDS demodulating unit for demodulating the RDS data and an RDS clock signal synchronizing with the RDS data from the broadcast signal; a counter for counting an interval between group types containing traffic information in the RDS data in synchronization with the RDS clock signal; and a radio control unit for receiving the group type containing the traffic information, and for executing radio processing other than receiving the traffic information during counting of the counter.

According to the present invention, it includes the counter for counting the interval between the group types containing the traffic information (TMC data) in the RDS data in synchronization with the RDS clock signal, and the radio control unit not only receives the group type containing the traffic information, but also executes the radio processing other than receiving the traffic information during the counting of the counter. In this way, it can receive the TMC data accurately in synchronization with the RDS clock signal and estimate the intervals between the TMC data appropriately, thereby offering an advantage of being able to execute the radio processing such as searching for an alternative station efficiently.

BRIEF DESCRIPTION OF THE DRAWINGS

FIG. 3 is a table explaining an example of counters A-D in FIG. 2;

BEST MODE FOR CARRYING OUT THE INVENTION

The best mode for carrying out the invention will now be described with reference to the accompanying drawings to explain the present invention in more detail.

Embodiment 1

Figure 1:
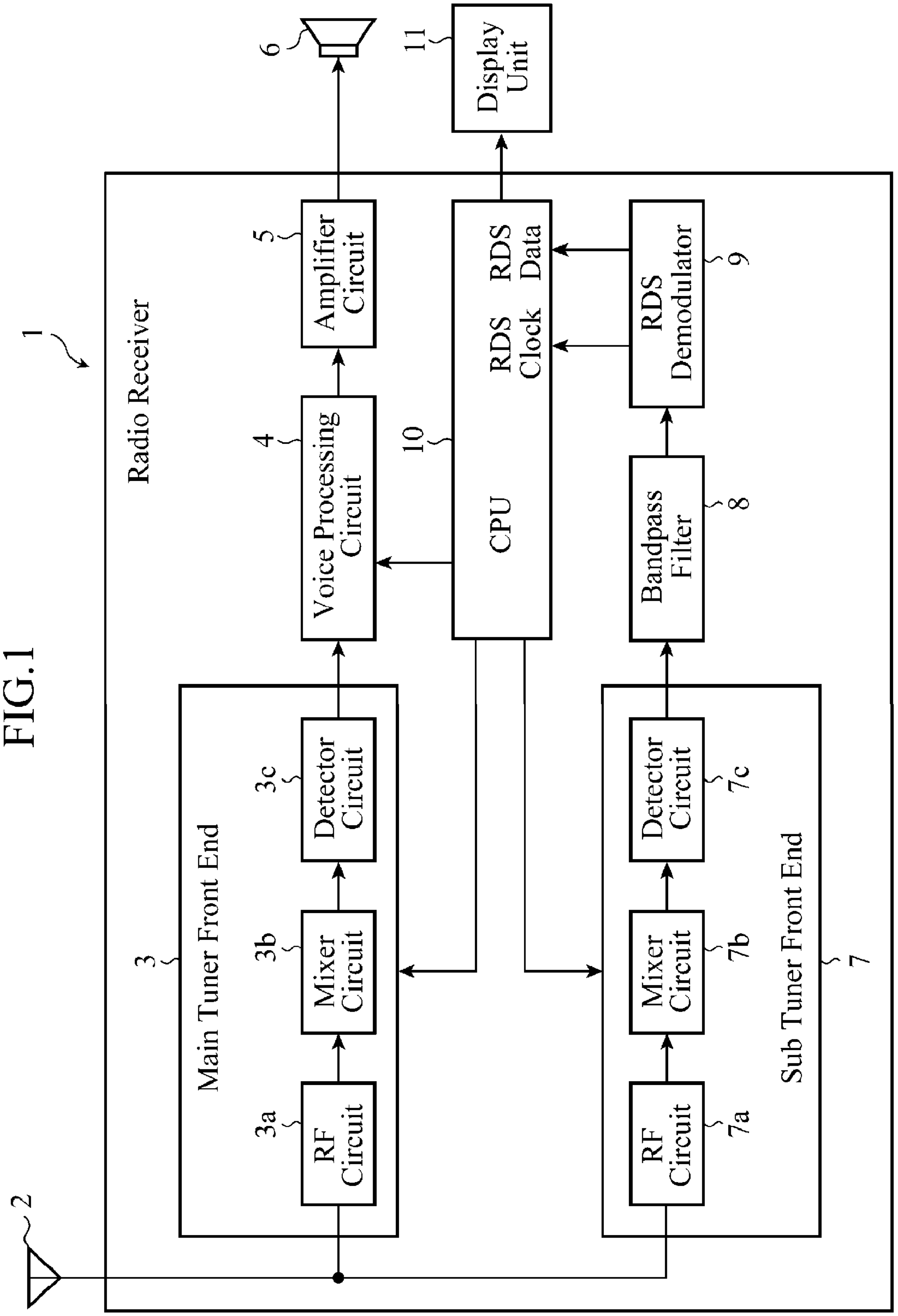
FIG. 1 is a block diagram showing a configuration of a radio receiver to which a receiving apparatus of an embodiment 1 in accordance with the present invention is applied.

FIG. 1 is a block diagram showing a configuration of a radio receiver to which a receiving apparatus of an embodiment 1 in accordance with the present invention is applied. In FIG. 1, the radio receiver 1 of the embodiment 1 has two tuners of main and sub, and includes a radio antenna 2, a main tuner front end 3, a voice processing circuit 4, an amplifier circuit 5, a speaker 6, a sub tuner front end 7, a bandpass filter 8, an RDS demodulator (RDS demodulating unit) 9, a CPU 10 and a display unit 11.

The radio receiver 1 receives a plurality of broadcast waves via the radio antenna 2, and one of the broadcast waves is detected by the main tuner front end 3 and is supplied to the voice processing circuit 4 and then to the amplifier circuit 5. Components relating to the radio sound reproduction in the main tuner front end 3, voice processing circuit 4, amplifier circuit 5 and CPU 10 constitute a first receiving system for reproducing radio sound from a broadcast wave (broadcast signal).

The main tuner front end 3 has an RF circuit 3*a*, a mixer circuit 3*b* and a detector circuit 3*c*. The RF circuit 3*a* carries out radio frequency amplification by tuning to a received signal from the radio antenna 2. The mixer circuit 3*b* mixes the signal passing through the radio frequency amplification by the RF circuit 3*a* with a local oscillation frequency signal to generate an intermediate frequency (IF: 10.7 MHz) signal. The detector circuit 3*c* detects the modulated signal from the intermediate frequency signal generated by the mixer circuit 3*b*.

The voice processing circuit 4, which is a component for performing sound processing on the signal from the main tuner front end 3, separates it into stereo signals. The amplifier circuit 5 amplifies the output of the voice processing circuit 4 to such a power level as enabling the sound output from the speaker 6. The speaker 6 receives the signal passing through the amplification with the amplifier circuit 5, and outputs radio sound.

In addition, components relating to the reproduction processing of the RDS data in the sub tuner front end 7, bandpass filter 8, RDS demodulator 9 and CPU 10 constitute a second receiving system for reproducing the RDS data extracted from the broadcast wave (broadcast signal).

The sub tuner front end 7 receives a broadcast from the RDS station via the radio antenna 2 and detects it, followed by supplying to the bandpass filter 8. The sub tuner front end 7 has an RF circuit 7*a*, a mixer circuit 7*b* and a detector circuit 7*c*. The RF circuit 7*a* tunes to a received signal from the radio antenna 2, and carries out radio frequency amplification. The mixer circuit 7*b* generates an intermediate frequency signal from the output of the RF circuit 7*a*. The detector circuit 7*c* detects the modulated signal from the intermediate frequency signal generated by the mixer circuit 7*b*.

The bandpass filter 8 passes only an RDS modulation signal with a frequency of 57 kHz and a pilot tone with a frequency of 19 kHz in the signal from the sub tuner front end 7. The RDS demodulator 9 demodulates the RDS modulation signal passing through the bandpass filter 8 to generate an RDS clock signal and RDS data. When the RDS modulation signal is not present, it generates the same clock signal as the RDS clock signal by dividing the frequency of the pilot tone into 1/16.

The CPU 10 controls the front ends 3 and 7 and voice processing circuit 4, and creates display data from the data obtained by radio processing (tasks) other than receiving the TMC data or from the TMC information extracted from the RDS data passing through the demodulation by the RDS demodulator 9. The display unit 11 receives the display data created by the CPU 10, and displays the TMC information or other radio information specified by the display data on a display screen.

The sub tuner front end 7 executes the following radio processing (tasks) in addition to the reception of the TMC data described above.

(1) A function of making and retaining a list of broadcasting stations receivable at present, and of always updating it (station list).

(2) A function of searching for an alternative station (AF station: Alternative Frequency) that broadcasts the same contents when the receiving state of the main tuner front end 3 deteriorates (AF search).

(3) A function of a TA (Traffic Announcement: traffic information) interrupt to an EON (Enhanced Other Network: extended network) station.

The foregoing functions (1)-(3) can be implemented by receiving a broadcasting station other than the TMC received station with the sub tuner front end 7. Thus, it is necessary, by switching between the broadcasting station from which the TMC data is received and another broadcasting station, to handle the tasks of both stations.

Incidentally, the CPU 10 executes a task switching processing program in accordance with the purpose of the present invention, thereby embodying a received station switching control unit as a concrete means having software and hardware operating together. The received station switching control unit controls the sub tuner front end 7 using the RDS data and RDS clock signal the CPU 10 receives, and executes the other radio processing (tasks) during intervals between the TMC data while receiving the TMC data appropriately.

Figure 2:
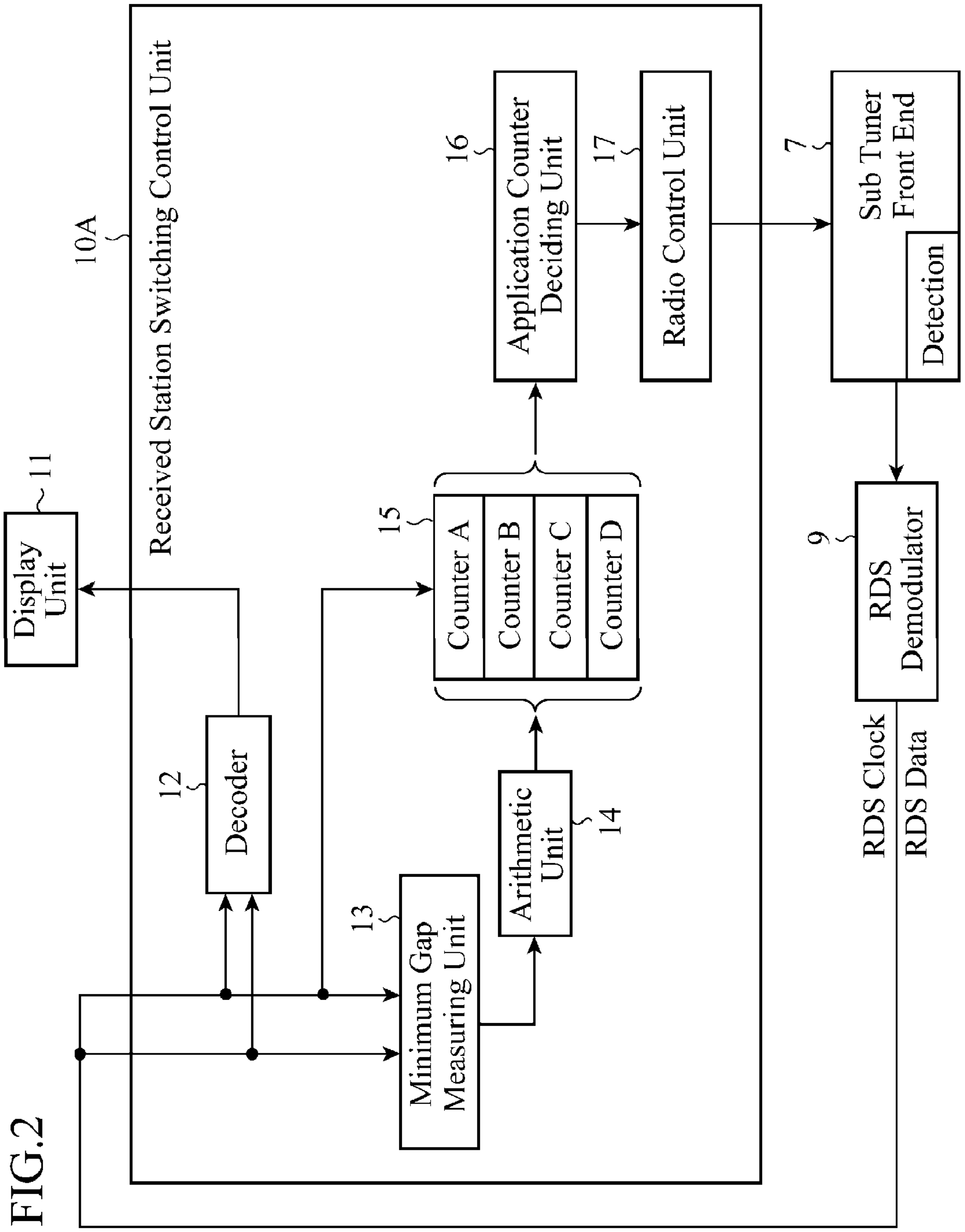
FIG. 2 is a block diagram showing a configuration of a received station switching control unit and its peripheral components.

FIG. 2 is a block diagram showing a configuration of the received station switching control unit and its peripheral components. In FIG. 2, the bandpass filter 8 in FIG. 1 is not shown. As shown in FIG. 2, the received station switching control unit 10A includes a decoder 12, a minimum gap measuring unit 13, an arithmetic unit 14, a counter group (counters) 15, an application counter deciding unit 16, and a radio control unit 17.

The decoder 12 receives the RDS data and RDS clock signal generated by the RDS demodulator 9, and creates the display data from the TMC data extracted by decoding the RDS data and from the data obtained in the radio processing (tasks) other than receiving the TMC information. The information specified by the display data is displayed on the display screen of the display unit 11.

The RDS data is transmitted continuously on a group type by group type basis consisting of a 104-bit data block. As for the group types, there are various types according to their purposes, and the TMC data belongs to group type 8A.

The minimum gap measuring unit 13 measures the number of group types received in an interval between the group types 8A containing the TMC data among the group types transmitted successively as the RDS data, and decides the minimum value of the number of group types resulting from the measurement as the gap inherent in the received station of the TMC data. Using the gap value determined by the minimum gap measuring unit 13, the arithmetic unit 14 defines specifications (counting target values) of the counters A-D constituting the counter group 15.

The counter group 15, which consists of counters (first to fourth counters) A-D to which the counting target values in accordance with the prescribed purposes are set by the arithmetic unit 14, counts the individual counting target values using the RDS clock signal in synchronization with the RDS data as a trigger. According to the counting operation of the counters A-D, switching timing between the received station of the TMC data and the other broadcasting station is given.

The application counter deciding unit 16 decides the application counter from among the counters A-D of the counter group 15 in accordance with the receiving state of the RDS data and the content of the TMC data, and notifies the radio control unit 17 of the counting state of the application counter. According to the counting state of the counter delivered from the application counter deciding unit 16, the radio control unit 17 carries out switching control between the reception of the TMC data with the sub tuner front end 7 and the other radio task execution.

Incidentally, as for the TMC data, the same data is repeatedly transmitted at least twice consecutively in a fixed time period (EN ISO 14819-1:2002). The gap is the number of group types received during an interval between the transmission of the TMC data. For example, if the gap is three, three group types are received during the interval between the TMC data.

In the RDS standard, the transmission interval of the TMC data (time interval between transmission of the TMC data) is defined in group type 3A. In practice, however, it is not transmitted in group type 3A in many cases, and even if it is transmitted, it does not often agree with the actual time interval in a field. On the other hand, since the RDS clock signal (1187.5 Hz) is obtained by dividing the subcarrier (57 kHz) of an actual FM broadcasting station by 48, it is strictly accurate and is synchronized with the RDS data. Since the subcarrier is a third harmonic of the pilot tone (19 kHz), receiving an FM broadcasting station whose broadcast signal contains the pilot tone will make it possible to extract a highly accurate RDS clock signal.

Thus, according to the present invention, it measures the gap between the group types containing the same content TMC data using the RDS clock signal as a trigger and the 104-bit group type as a measurement unit, defines the counting target values of the counters A-D from the gap obtained as a result of the measurement, and carries out counting in synchronization with the RDS clock signal. In this manner, it is possible to receive the TMC data appropriately, and to execute the other radio tasks efficiently during the intervals.

FIG. 3, which is a table for explaining an example of the counters A-D in FIG. 2, shows purposes of the counters A-D, their details, the number of group types to be counted (counting target values), and reasons for the settings. As shown in FIG. 3, the counters A and B are defined as counters for calculating the number of group types transmitted during the interval between the group types 8A containing the TMC data.

As for the counter (first counter) A, when the TMC data to be received next is expected to have the same content as the TMC data previously received, the application counter deciding unit 16 applies the counter so that it defines run time for executing the radio tasks (radio tasks other than receiving the TMC data), during which the reception of the group type containing the TMC data with the same content is skipped.

In the example of FIG. 3, the number of group types (counting target value) to be counted by the counter A is 2×Gap+1. The counting target value corresponds to the interval from the reception of the group type containing the TMC data, followed by skipping the reception of the group type containing the TMC data with the same content, up to the reception of the group type containing the next new TMC data.

Here, the Gap is the minimum gap the minimum gap measuring unit 13 determines. The counter A is set by considering the fact that the TMC data with the same content is transmitted at least twice consecutively in the RDS data. By counting up to the counting target value, the reception of the group type containing the TMC data with the same content is skipped, during which the radio tasks other than receiving the TMC data are executed.

As for the counter (second counter) B, when the content of the TMC data previously received is unknown, or is the same as the TMC data currently received, the application counter deciding unit 16 applies the counter so as to count the number of group types corresponding to the Gap (minimum gap) used as the counting target value.

When the currently received TMC data has the same content as the previously received TMC data in the two consecutive same data transmission specified in the TMC standard, different TMC data will arrive next time. In this case and the case where the content of the previously received TMC data is unknown, the counter B is applied, and during the operation of the counter B, the radio tasks other than receiving the TMC data are executed.

In addition, the counters C and D are applied when the reception of the TMC data is impossible. The counter (third counter) C, a counter applied at a point when the TMC data cannot be received owing to some causes, counts a reception standby time from the time when the reception is broken to the time when the reception of the TMC data from the received station so far is given up.

In the example of FIG. 3, the number of group types to be counted by the counter C is defined by Gap+2+1. In other words, the TMC data reception standby time corresponds to the total time period of the number of group types corresponding to the minimum gap (Gap), the number of group types (2) of the previous TMC data and the next TMC data to be received at the interval corresponding to the gap, and one group type (1) as a margin.

The counter (fourth counter) D, a counter applied when the counter C counts up the counting target value (when the TMC reception standby becomes timeout), counts the time during which the radio tasks other than receiving the TMC data are carried out. In FIG. 3, the counting target value of the counter D is defined as Gap−1. In other words, it is a value resulting from subtracting the number of group type (1) the counter C counts as the margin from the number of group types corresponding to the minimum gap (Gap).

Next, the operation will be described.

Figure 4:
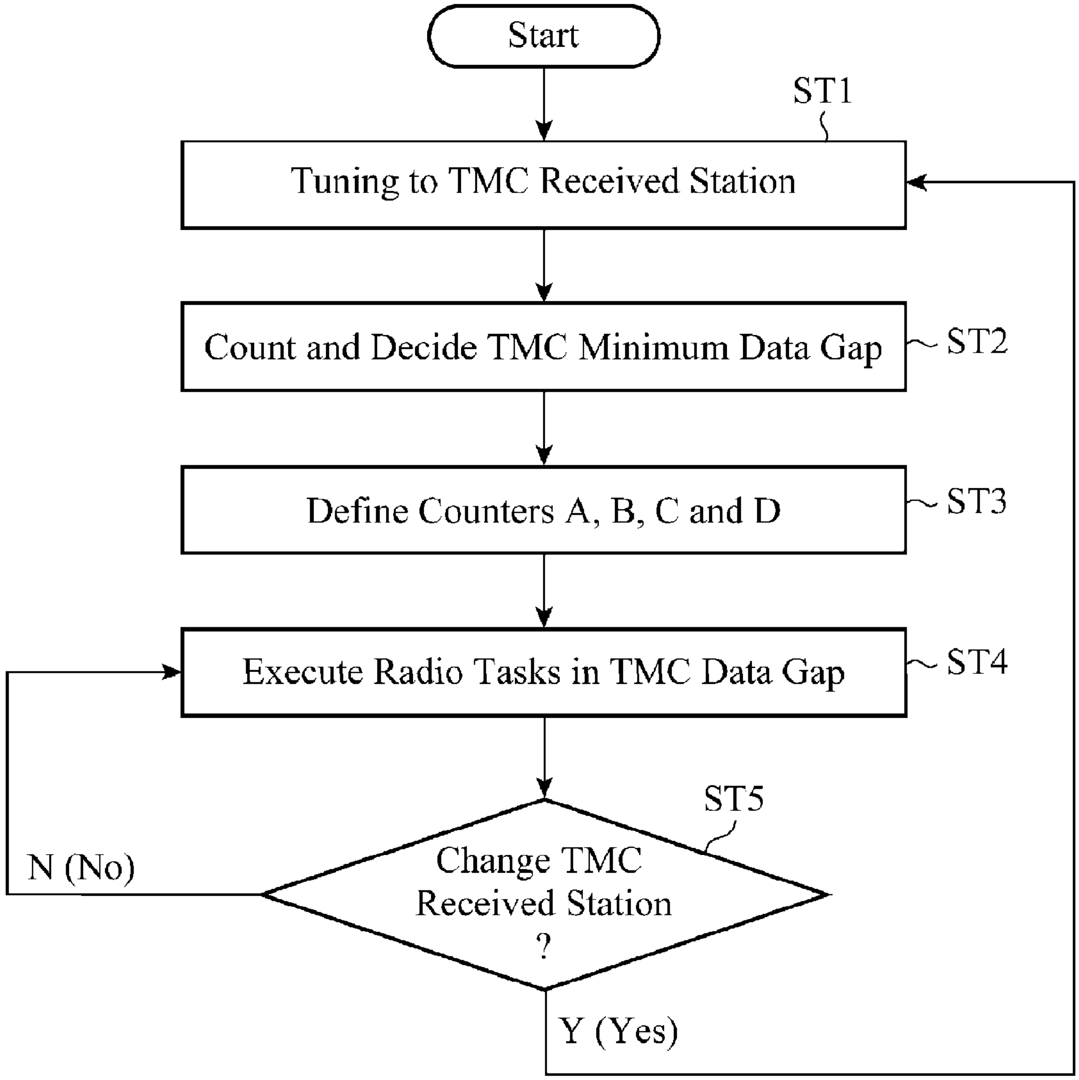
FIG. 4 is a flowchart showing a flow of the operation of the radio receiver in FIG. 1.

FIG. 4 is a flowchart showing a flow of the operation of the radio receiver in FIG. 1, and shows the switching operation between the TMC data reception and the other radio tasks in the sub tuner front end 7.

First, the radio control unit 17 tunes the sub tuner front end 7 to an RDS station (referred to as "TMC received station" from now on) that transmits the group type containing the TMC data (step ST1).

When the tuning has been completed, the sub tuner front end 7 receives a broadcast from the TMC received station via the radio antenna 2, and the RDS modulation signal extracted through the bandpass filter 8 is supplied to the RDS demodulator 9. The RDS demodulator 9 demodulates the RDS clock signal and RDS data from the RDS modulation signal, and supplies them to the received station switching control unit 10A.

Receiving the RDS clock signal and RDS data from the RDS demodulator 9, the minimum gap measuring unit 13 identifies the group type 8A in the RDS data, and counts the minimum value of the number of group types in the interval between the group types 8A using the RDS clock signal as a trigger.

More specifically, the minimum gap measuring unit 13 executes the counting processing by receiving the TMC data received from the TMC received station during a prescribed measurement time period, extracts the minimum value of the gap (minimum gap) between the 8A data obtained as a result of the measurement, and makes it a value inherent in the TMC received station (step ST2). The gap (minimum gap) determined by the minimum gap measuring unit 13 is supplied from the minimum gap measuring unit 13 to the arithmetic unit 14.

Using the gap acquired from the minimum gap measuring unit 13, the arithmetic unit 14 defines the counting target values of the counters A-D as shown in FIG. 3 (step ST3). Subsequently, the application counter deciding unit 16 decides the application counter from the counters A-D in accordance with the content of the TMC data received and the reception state of the RDS data. The application counter gives the TMC reception time and radio task run time, and according to these time periods, the radio control unit 17 controls the sub tuner front end 7 to switch between the TMC reception and the other radio task (step ST4).

In addition, the radio control unit 17 has a switching function of the TMC station when the TMC reception becomes impossible owing to reduction in the electric field (step ST5), and unless the change of the TMC received station is set, it returns its processing to step ST4. In contrast, when a new TMC received station is set, the radio control unit 17 returns to step ST1 to tune to the new TMC received station and to repeat the foregoing processing.

Next, the sub tuner tuning control using the counters A-D as a concrete example will be described.

Figure 5:
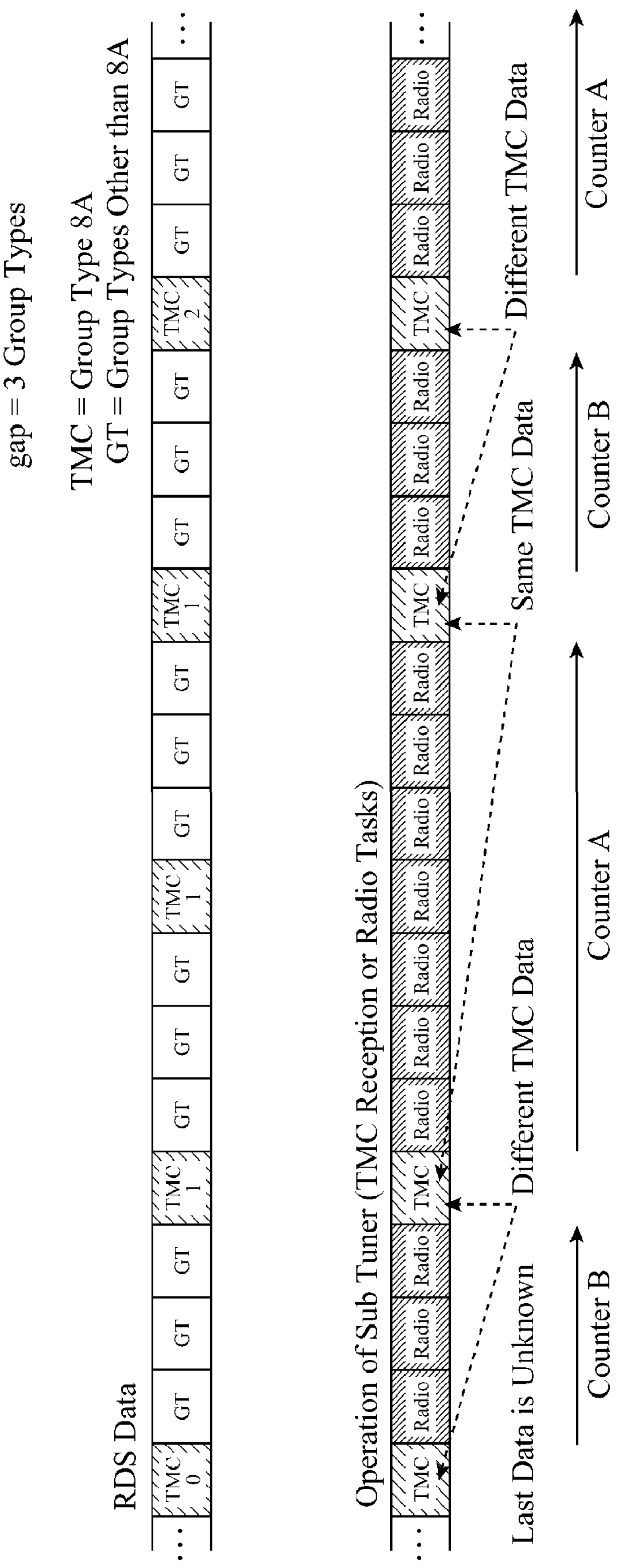
FIG. 5 is a diagram showing processing at a time when a sub tuner can receive TMC data stably.

FIG. 5 is a diagram for explaining the processing when the sub tuner can receive the TMC data stably. Incidentally, FIG. 5 shows a case where the minimum gap (Gap) corresponds to three group types. As shown in FIG. 5, when the content of the TMC data previously received is unknown or when the latest TMC data agrees with the content of the TMC data previously received, the application counter deciding unit 16 applies the counter B, and causes the radio control unit 17 to control the sub tuner front end 7 until the counter B counts up to the counting target value to execute the foregoing radio tasks (1)-(3).

For example, when "TMC 0" is received first, since the content of this TMC data is unknown, the counter B starts its counting of the gap (Gap). During the counting, since the group types GT other than the group type 8A are transmitted, the radio control unit 17 controls the sub tuner front end 7 to execute the radio tasks (radio tasks other than the TMC reception) designated by "Radio" in FIG. 5.

Unless the latest TMC data agrees with the content of the TMC data previously received, the application counter deciding unit 16 applies the counter A to count up to 2×Gap+1 (=7). In the example of FIG. 5, since "TMC 0" received previously differs from the latest "TMC 1" in the content, it is expected that the TMC data with the same content will be transmitted following the latest "TMC 1".

Accordingly, while the counter A is counting, the radio control unit 17 executes the radio tasks other than the TMC reception by controlling the sub tuner front end 7. By applying the counter A, the reception of the group type containing the TMC data with the same content is skipped. This makes it possible to assign a longer time to the radio tasks other than the TMC reception. Incidentally, FIG. 5 shows a case where the TMC data with the same content is transmitted three consecutive times.

When the counter A completes counting its counting target value, the latest TMC data (TMC 1) agrees with the content of the TMC data (TMC 1) received previously. Accordingly, the application counter deciding unit 16 selects the counter B again and repeats the above-mentioned processing. In this way, the radio tasks are executed in the intervals between the TMC data gaps.

Figure 6:
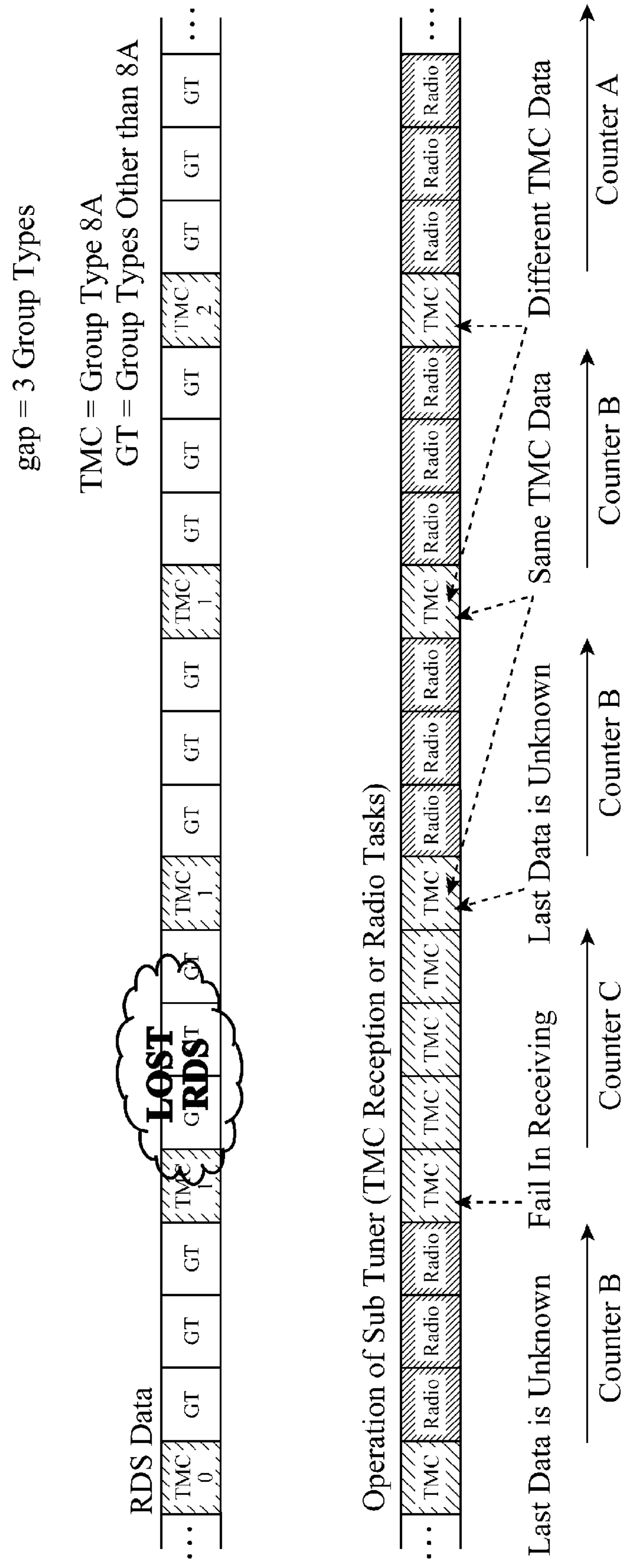
FIG. 6 is a diagram showing processing at a time when the sub tuner cannot receive TMC data temporarily.

FIG. 6 is a diagram showing the processing at a time when the sub tuner cannot receive the TMC data temporarily. As shown in FIG. 6, if the TMC data of "TMC 1" or the other RDS data (group type), which will be transmitted when the counter B completes counting the gap after receiving the previous "TMC 0", cannot be received, the application counter deciding unit 16 switches from the counter B to the counter C.

Next, from the point of becoming unable to receive, the counter C starts its counting and increments its count value in accordance with the elapsed time of each group type. While the counter C is counting, the radio control unit 17 is in the reception standby state of the TMC data from the TMC received station up to that time. Thus, it does not switch the TMC received station immediately, but maintains the tuning to the TMC received station so far.

If the TMC data reception is restarted before the counter C completes counting its counting target value (Gap+2+1) as shown in FIG. 6, the application counter deciding unit 16 switches from the counter C to the counter B because the content of the previous TMC data (first TMC 1) is unknown. Then, if the sub tuner can receive the TMC data stably, the processing similar to that of FIG. 5 is repeated.

Figure 7:
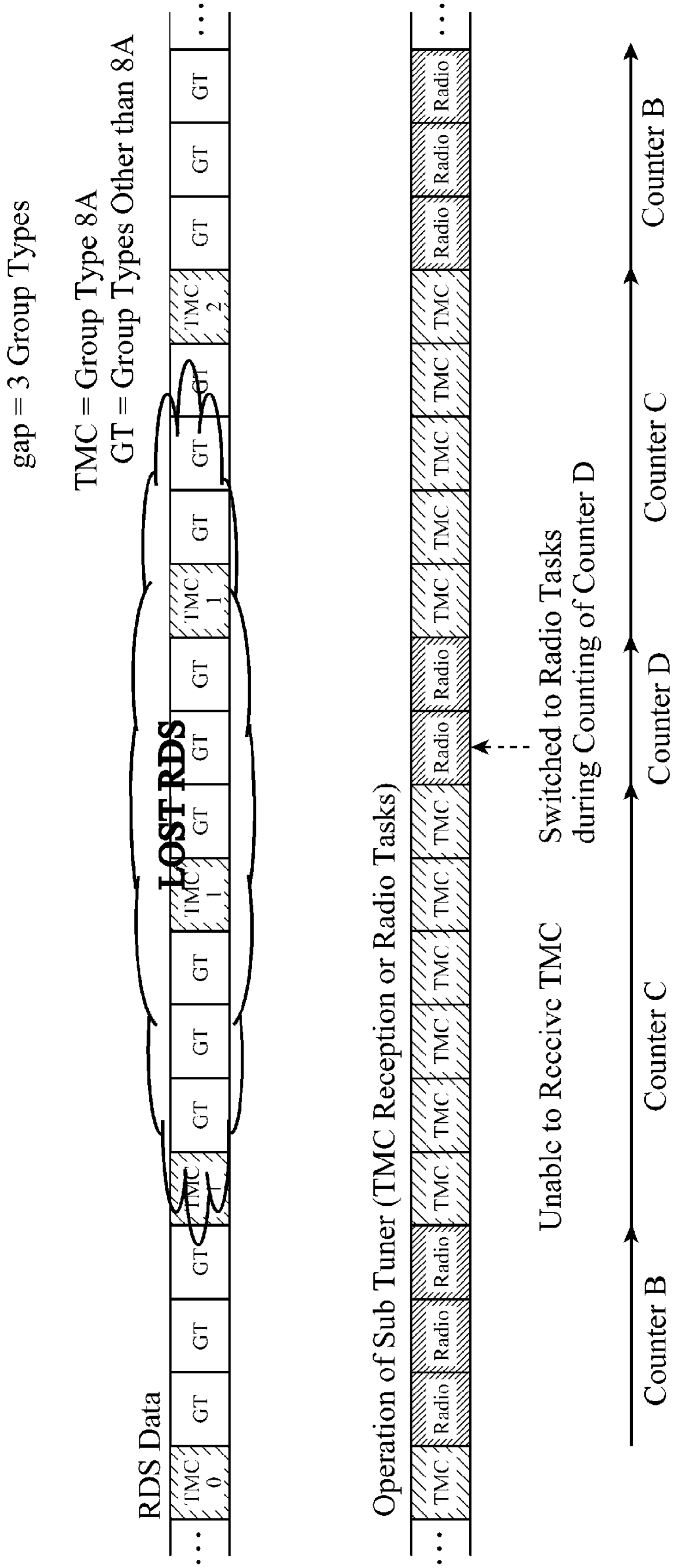
FIG. 7 is a diagram showing processing at a time when the sub tuner cannot receive TMC data and a counter C becomes timeout.

FIG. 7 is a diagram showing the processing at a time when the sub tuner cannot receive the TMC data until the counter C reaches the timeout. Thus, it shows a case where the TMC data or the other RDS data cannot be received until the counter C counts up the target value in the example of FIG. 6. As shown in FIG. 7, when the timeout of the counter C occurs, the application counter deciding unit 16 applies the counter D to start the counting. During the counting, the radio control unit 17 controls the sub tuner front end 7 to execute the radio tasks (the radio tasks other than the TMC reception).

When the counter D completes its counting, the application counter deciding unit 16 switches the counter D to the counter C to start its counting, and the radio control unit 17 controls the sub tuner front end 7 so as to tune to the TMC received station again. Thus, the TMC data reception is tried again. In this state, when the group type containing the TMC data (TMC 2) is received as shown in FIG. 7, the processing similar to that of FIG. 5 is repeated. In contrast, if the timeout of the counter C occurs again without receiving the TMC data, the above-mentioned processing is repeated.

As described above, according to the present embodiment 1, it includes the counter for counting the intervals between the group types 8A containing the TMC data in the RDS data in synchronization with the RDS clock signal used as the trigger, and the radio control unit 17 controls the sub tuner front end 7 to receive the group type 8A, and carries out the radio processing other than receiving the TMC data during the counting of the counter.

In this configuration, it includes the minimum gap measuring unit 13 for measuring the number of group types received in the interval between the group types 8A containing the TMC data in particular, and for defining the minimum value of the number of group types as the Gap; the counter B counts the interval corresponding to the Gap in synchronization with the RDS clock signal; and the radio control unit 17 controls the sub tuner front end 7 in such a manner as to execute the radio processing other than receiving the TMC data during the counting of the counter B.

In this way, it counts the intervals between the TMC data with the counters employing as the trigger the RDS clock signal that has high frequency accuracy because it is obtained by dividing the subcarrier of the FM broadcasting station and that is synchronized with the RDS data accurately. Accordingly, it can receive the TMC data accurately in synchronization with the RDS clock signal, and can estimate the intervals of the TMC data appropriately, thereby being able to execute the radio processing such as searching for an alternative station efficiently. For example, as compared with the case of using a timer within the radio receiver, which does not synchronizing with the RDS data, it can improve the data reception accuracy.

In addition, according to the present embodiment 1, it includes the counter A for counting, after receiving the group type 8A containing the TMC data, the interval passing through the repeated transmission of the group type 8A containing the TMC data with the same content, up to the reception of the next group type 8A containing the TMC data in synchronization with the RDS clock signal, and the radio control unit 17 controls the sub tuner front end 7 in such a manner as to execute the radio processing other than receiving the TMC data during the counting of the counter A. Thus, when the TMC data with the same content is expected to occur consecutively, its reception is skipped to enable the radio processing (tasks) other than the TMC data reception to be executed efficiently.

Furthermore, according to the present embodiment 1, it includes the counter C for counting in synchronization with the RDS clock signal the standby interval waiting for receiving the group type 8A containing the TMC data from the point at which the reception of the RDS data is broken, and the counter D for counting the prescribed radio processing interval from the point of the timeout of the standby interval of the counter C in synchronization with the RDS clock signal, and the radio control unit 17 controls the sub tuner front end 7 in such a manner as to wait for receiving the TMC data during the counting of the counter C and to execute the radio processing other than receiving the TMC data during the counting of the counter D. Thus, when the reception of the TMC data becomes impossible, it can execute the radio processing (tasks) other than receiving the TMC data efficiently, and can restart the reception of the TMC data immediately after the restoration of the TMC data reception.

INDUSTRIAL APPLICABILITY

As described above, to enable receiving the TMC data stably and receiving the TMC data immediately after restoration even if the reception of the RDS data becomes impossible, a receiving apparatus in accordance with the present invention is configured in such a manner as to have a first receiving system for receiving a broadcast signal from a broadcasting station to reproduce radio sound and a second receiving system for receiving RDS (Radio Data System) data in the broadcast signal, wherein the second receiving system includes: an RDS demodulating unit for demodulating the RDS data and an RDS clock signal synchronizing with the RDS data from the broadcast signal; a counter for counting an interval between group types containing traffic information in the RDS data in synchronization with the RDS clock signal; and a radio control unit for receiving the group type containing the traffic information, and for executing radio processing other than receiving the traffic information during counting of the counter. Accordingly, it relates to an onboard receiving apparatus, and is particularly suitable for being applied to a receiving apparatus for receiving traffic information broadcast from an RDS station.

What is claimed is:

1. A receiving apparatus having a first receiving system for receiving a broadcast signal from a broadcasting station to reproduce radio sound and a second receiving system for receiving RDS (Radio Data System) data in the broadcast signal, the second receiving system comprising:

an RDS demodulating unit for demodulating the RDS data and an RDS clock signal synchronizing with the RDS data from the broadcast signal;

a counter for counting an interval between group types containing traffic information in the RDS data in synchronization with the RDS clock signal; and a radio control unit for receiving the group type containing the traffic information, and for executing radio processing other than receiving the traffic information during counting of the counter.

2. The receiving apparatus according to claim 1, wherein the second receiving system comprises a minimum gap measuring unit for measuring the number of group types received in the interval between the group types containing the traffic information and for determining a minimum value of the number of group types as a gap;

the counter comprises a first counter for counting the interval corresponding to the gap in synchronization with the RDS clock signal; and the radio control unit executes the radio processing other than receiving the traffic information during counting of the first counter.

3. The receiving apparatus according to claim 2, wherein the counter comprises a second counter for skipping, after receiving the group type containing the traffic information, receiving the group type containing the traffic information with the same content, and for counting an interval up to receiving the next group type containing new traffic information in synchronization with the RDS clock signal; and the radio control unit executes the radio processing other than receiving the traffic information during counting of the second counter.

4. The receiving apparatus according to claim 3, wherein the counter comprises a third counter for counting, from a point of time at which reception of the RDS data is broken, a standby interval for waiting to receive the traffic information in synchronization with the RDS clock signal, and a fourth counter for counting, from a point of time at which counting of the standby interval by the third counter is completed, a prescribed radio processing interval in synchronization with the RDS clock signal; and the radio control unit waits for receiving the traffic information during counting of the third counter, and executes the radio processing other than receiving the traffic information during counting of the fourth counter.

* * * * *